United States Patent [19]
Swan

[11] Patent Number: 6,055,018
[45] Date of Patent: Apr. 25, 2000

[54] SYSTEM AND METHOD FOR RECONSTRUCTING NONINTERLACED CAPTURED CONTENT FOR DISPLAY ON A PROGRESSIVE SCREEN

[75] Inventor: Philip L. Swan, Toronto, Canada

[73] Assignee: ATI Technologies, inc., Thornhill, Canada

[21] Appl. No.: 08/964,243

[22] Filed: Nov. 4, 1997

[51] Int. Cl.[7] ................................ H04N 7/01; H04N 5/46
[52] U.S. Cl. ...................... 348/448; 348/448; 348/447; 348/459; 348/556
[58] Field of Search .................................... 348/441, 446, 348/448, 447, 452, 455, 459, 556, 558, 700

[56] References Cited

U.S. PATENT DOCUMENTS

| | | | |
|---|---|---|---|
| 4,020,463 | 4/1977 | Himmel | 340/146.3 |
| 5,398,071 | 3/1995 | Gove et al. | 348/558 |
| 5,473,382 | 12/1995 | Nohmi et al. | 348/448 |
| 5,610,661 | 3/1997 | Bhatt | 348/446 |
| 5,689,301 | 11/1997 | Christopher et al. | 348/97 |
| 5,796,437 | 8/1998 | Muraji et al. | 348/452 |
| 5,872,600 | 2/1999 | Suzuki | 348/459 |
| 5,883,671 | 3/1999 | Keng et al. | 348/397 |

*Primary Examiner*—Michael H. Lee
*Assistant Examiner*—Paulos Natnael
*Attorney, Agent, or Firm*—Markison & Reckamp, P.C.

[57] ABSTRACT

An image reconstruction system adaptively de-interlaces video stream content using image data comparison techniques when the interlaced input video stream does not contain pre-coded non-interlaced to interlaced conversion status data. In one embodiment, the system uses a signature generator which generates a plurality of field signature values on a per field basis by determining region values based on fluctuations in pixel data, such as luminance data within a horizontal scan line to detect changes in motion. The field signature values are then analyzed to determine a probability that the content is one of several types such as content that has undergone non-interlaced to interlaced conversion, such as pull down conversion for film captured content. Also, independent of whether conversion has occurred, the system analyzes the video streams to determine whether the video stream contains a paused image or slow motion playback of images and de-interlaces accordingly.

40 Claims, 11 Drawing Sheets

SIGNATURE GENERATOR

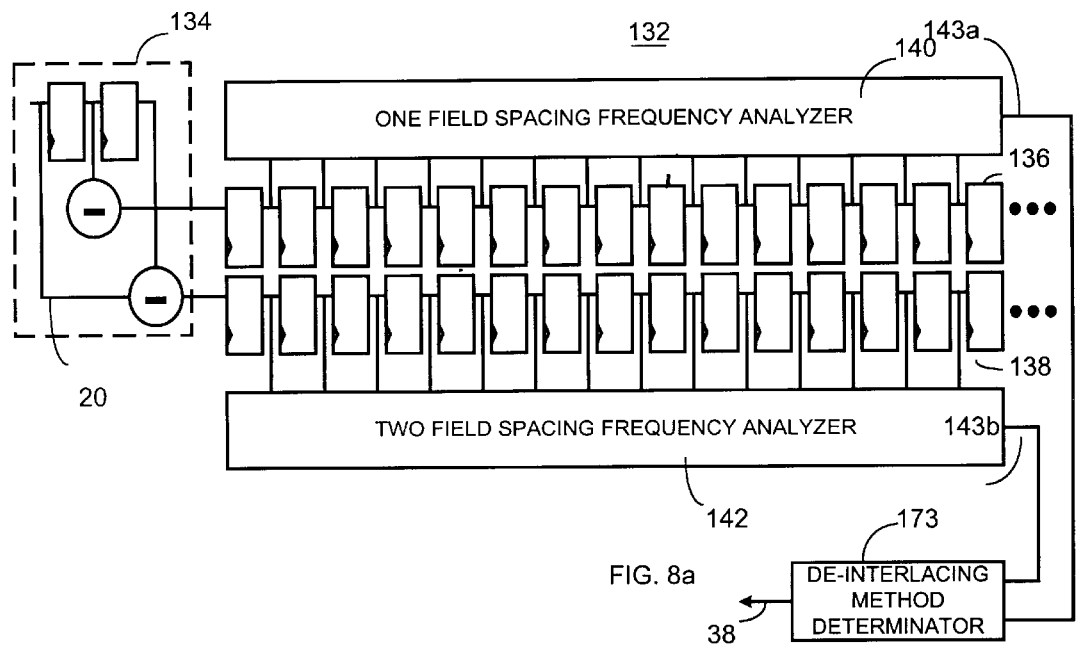
FIG. 8a
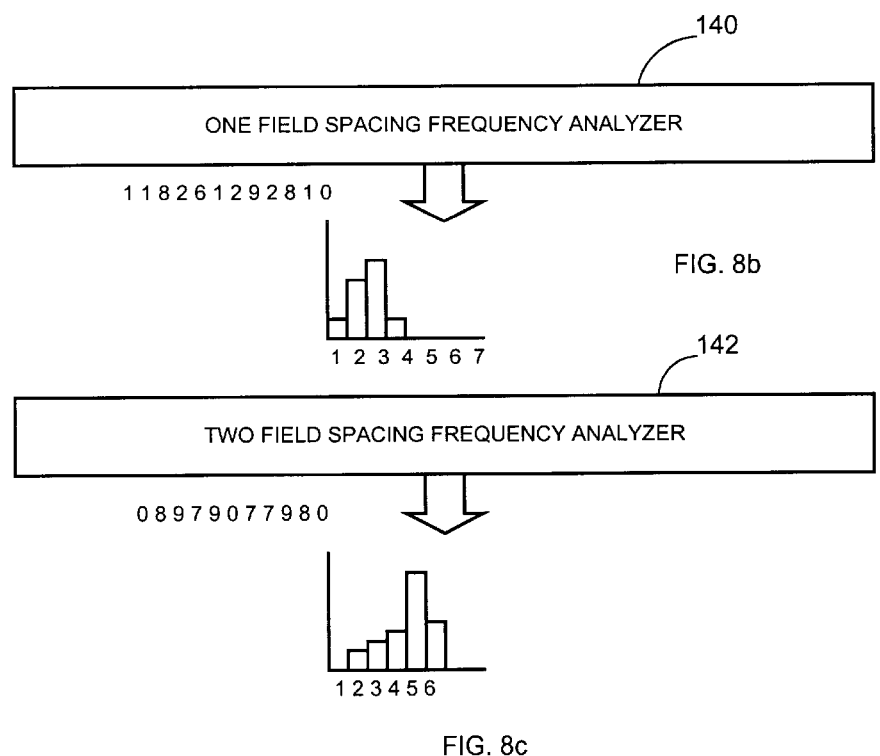
FIG. 8b
FIG. 8c

SYSTEM AND METHOD FOR RECONSTRUCTING NONINTERLACED CAPTURED CONTENT FOR DISPLAY ON A PROGRESSIVE SCREEN

BACKGROUND OF THE INVENTION

The invention relates generally to systems and methods for de-interlacing interlaced content for display on a progressive screen and more particularly to systems and methods for determining whether fields of an interlaced input stream can be paired, or grouped, without undesirable artifacts, such as systems and methods for determining whether an interlaced input stream was originally non-interlaced information and has undergone non-interlaced to interlaced conversion or systems that perform pattern recognition to facilitate suitable de-interlacing.

Interlaced content is typically video and is defined by standards such as NTSC, PAL or SECAM. Interlaced video may also be compressed video, such as that defined in the MPEG-2 standard for compressed video. If pairs/groups of even and odd fields can be combined without artifacts, then it is desirable for the image on the progressive display to be derived from a pair or group of fields rather than from just a single field. This generally results in a higher vertical resolution.

Pairing or grouping of two fields of video generally means making an association between two or more fields of video. Such an association may be used to combine fields and or weave even fields and odd fields within a pair or group together, either in whole or in part. When presented on a progressive (non-interlaced) display, a weaved image will have even field lines alternating spatially with odd field lines. In contrast, on an interlaced display, even field lines generally alternate spatially and temporally with odd field lines.

Unintelligent pairing and weaving of fields of video data can produce undesirable motion artifacts. These artifacts typically occur if motion is occurring in the video sequence, and if the paired fields of video were captured at significantly different points in time. The artifact can appear as a jagged edge or double image. Therefore it is desirable to improve image quality and intelligently pair fields and avoid motion artifacts. This includes content containing scenes with no motion, and content that was captured or created in a sufficiently non-interlaced way.

For example, an animator who creates an animated sequence may draw only one image for every five fields of video due to the effort involved. A progressive-to-interlaced conversion occurs when the animated sequence is transferred to a video format. To provide high quality images, it would be desirable to have a system that could automatically obtain knowledge of which fields of video were likely derived from the same original image so that proper pairing and display of the images results in removal of motion artifacts.

Also, as shown in FIG. 1, filmmakers have standardized on 24 film images per second. Film, when converted to NTSC undergoes a 3:2 pull down conversion. When film is converted to PAL, it undergoes a 2:2 conversion. Hence, with progressive display screens, such as computer screens and other screens that do not display images by altering between even and odd fields, interlaced images have to be de-interlaced for improved display quality. If the display system can detect a pattern in the image stream, such as a progressive to interlaced conversion, the system can better prepare images for the progressive display by combining fields that can be combined to create a higher quality image.

Moreover, other types of video content can be improperly displayed with motion artifacts resulting in less than desirable image quality. For example when video stream content is slow motion replay, such as from a sporting event, the content may have sets of successive fields that came from the same original captured image. Improper pairing of slow motion content can result in motion artifacts. Also, where little motion exists, the absence or partial absence of motion in a scene can result in undesirable artifacts, therefore parts of the scene should be properly de-interlaced to reduce such effects. In addition, if an image is paused, or advancing slowly forwards or backwards, such as from video playback devices or other source, typical default techniques of de-interlacing (referred to as "hop") can produce artifacts. A "hop" de-interlace technique, or two field bob, derives a progressive image form a single field by scaling and shifting the field. Usually the most recent field is used and this field will alternately be an even field, then an odd field, and then an even field. Another technique used, called "skip" or single field bob, will only use even or odd fields and will not alternate between the two fields. Therefore, suitable detection and pairing is needed to properly display such content.

In encoded video systems such as MPEG-2 systems, an interlaced video stream can contain precoded pull down status data that is analyzed by a decoder to determine whether the interlaced video stream has undergone pull down conversion. Conversion status data typically represents how the non-interlaced to interlaced conversion was done or is data the represents how the conversion should be undone. The decoder can then direct the field data from a frame storage device in a way that allows even and odd fields from the same film frame to be combined and displayed in a proper order.

However, most interlaced input video streams do not contain precoded pull down conversion status data or any other kind of pre-coded data information that indicates that a particular pattern exists. It is difficult to achieve a higher quality de-interlaced image since the decoder and de-interlacing system does not know which fields can be paired or grouped without artifacts and which fields cannot. As a result of the absence of the pre-coded information, video streams are typically not de-interlaced by properly pairing fields.

Consequently, there exists a need for a system and method for determining how to effectively de-interlace based on pattern analysis or other image evaluation technique. Where the content in the video stream underwent conversion, the system should reconstruct non-interlaced captured content for display on a progressive screen by automatically determining whether an interlaced input video stream has fields that can be paired or group to improve image quality. Such a system and method should determine whether the video content was originally recorded in a non-interlaced fashion and has undergone non-interlace to interlace conversion or the whether another type of image pattern exists in the content to suitably de-interlace the video content. Such as system and method should make the determination in an expedient manner to facilitate suitable image resolution on a progressive display.

BRIEF DESCRIPTION OF THE DRAWINGS

FIG. 8a is a block diagram generally depicting one embodiment of a pattern probability generator;

FIG. 8c diagrammatically illustrates operation of the pattern probability generator of FIG. 8a.

DETAILED DESCRIPTION OF THE INVENTION

Figure 1:
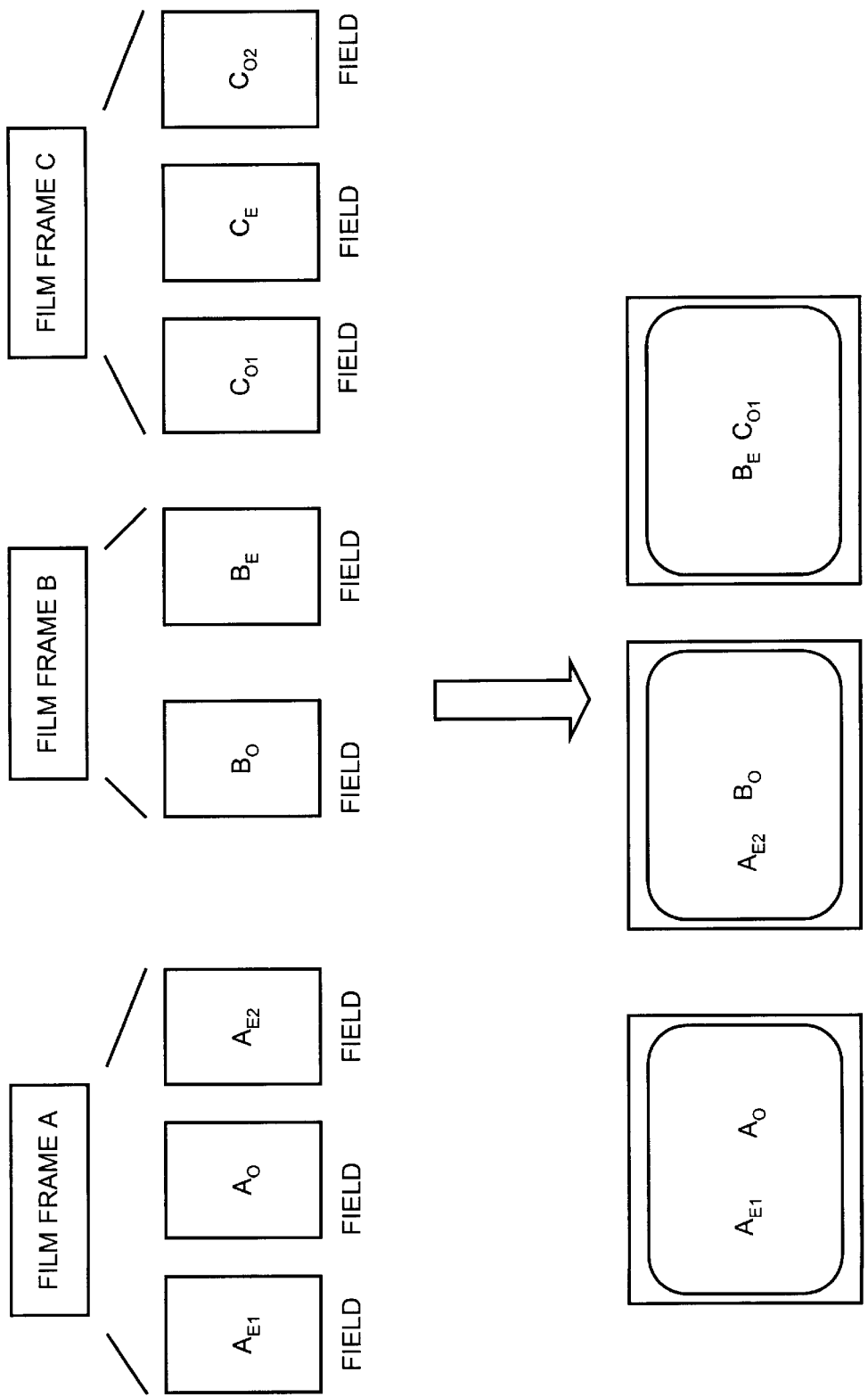
FIG. 1 is a block diagram generally illustrating a 3:2 pull down conversion of film captured content.

Generally, the disclosed system analyzes captured video content and constructs a sequence of images for a progressive display from data in an interlaced video stream, using image data comparison techniques, such as pattern matching, when the interlaced input video stream does not contain pre-coded non-interlaced to interlaced conversion status data. The system performs adaptive de-interlacing based on analyzing video stream content and generating probability data, such as slow motion probability data, pause probability data or other suitable pattern probability data. The system determines for example which field to use to fill in missing lines in the current field (e.g., whether to weave a current field with a previous or subsequent field, an opposite field or both using interpolation).

When the input video stream contains content originally recorded as non-interlaced data, the system determines whether the interlaced input video stream underwent non-interlaced to interlaced conversion, by generating non-interlaced (progressive) to interlaced probability data, such as film pull down probability data to identify if the interlaced input video stream was originally recorded in a non-interlaced manner. The system analyzes the non-interlaced to interlaced probability data and de-interlaces the input video stream accordingly when video stream data has been detected to have originally been created in a non-interlaced manner.

The disclosed system attempts to determine if pairs or groups of even and odd fields exist in the video stream where even field pixels and odd field pixels were near each other in the scene and captured or sampled by the image recording device at approximately the same time. Capture of pixel data is rarely instantaneous, but rather is defined by a shutter time which is in turn chosen based on lighting of a scene, motion in the scene and other factors.

For example, some video cameras will capture an even field and an odd field at the same time. Others will capture them at different times, but the spacing of even and odd captures is non-uniform and in some cases depends on the needed shutter speed. In this case, at time=0, one field is "exposed" for the required time, then the other field is "exposed", and then the camera waits for $1/30^{th}$ of a second (NTSC) or $1/25^{th}$ of a second (PAL, SECAM) to repeat the process. Thus, if the exposure time is short, then pairs of fields are captured at nearly the same time. Suitable fields for pairing and grouping generally include those that are close enough in time that motion between the fields in a pair or group can be combined for display without undesirable artifacts. Accordingly, among other abilities, the disclosed system and method can detect paused or slowly advancing (forward or backward) video streams and can direct the progressive display controller to use the best de-interlacing technique for the detected pattern.

In one embodiment, the system uses a signature generator which generates a plurality of field signature values on a per field basis by determining region values based on fluctuations in pixel data, such as luminance data within a horizontal scan line to determine the similarity of fields to one another. The field signature values are then analyzed to determine a probability that the fields have undergone non-interlaced to interlaced conversion, such as film pull down conversion. The system generates non-interlaced to interlaced probability data and analyzes the data to determine the type of non-interlaced to interlaced conversion. If non-interlaced to interlaced conversion has occurred, the system determines the type of conversion such as whether the conversion was NTSC type film pull down conversion or PAL film pull down conversion. The system then selectively de-interlaces the interlaced input video stream using the results from the non-interlaced to interlaced probability data generation to direct selection of fields for use in generating each image for the progressive display, use a combination of weave and bob techniques or other desirable techniques. If desired, a user may select one of a plurality of selectable non-interlaced to interlaced probability generating stages depending on the type input video stream and thus bias the detection system towards detecting a particular type of pattern such as PAL or NTSC pull down film. Other probability generating stages are used to determine whether the video stream contains a paused image or slow motion playback of images. The invention may be used in multi-media computer systems, cable or satellite set top boxes or any suitable application where suitably captured content exists.

In another embodiment, the system determines whether the video stream contains a paused image or slow motion playback of images, independent of whether the input video stream underwent some type of conversion.

Figure 2:
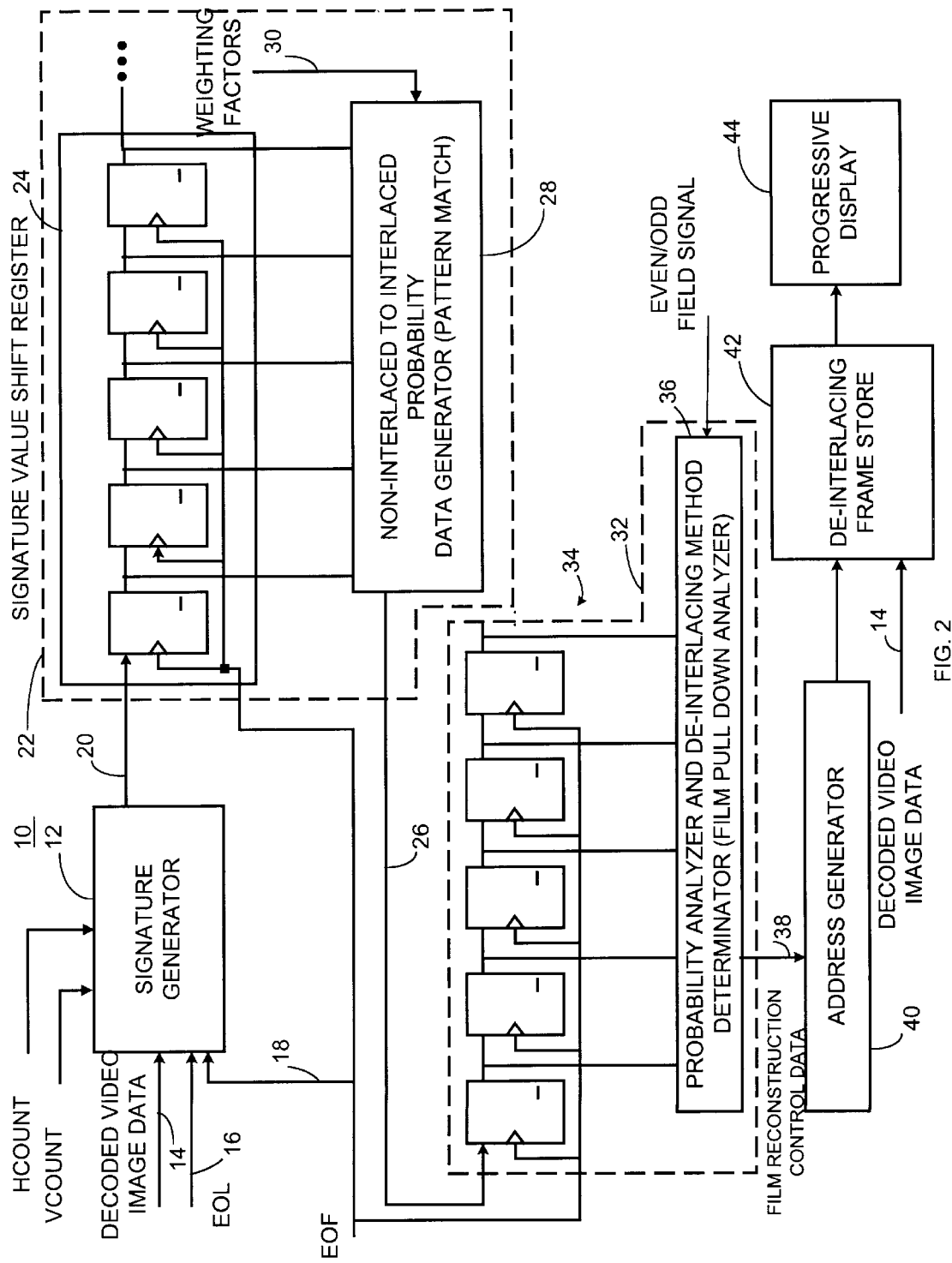
FIG. 2 is a block diagram generally illustrating one embodiment of a system for pairing or grouping fields of suitably captured content to facilitate reconstructing of images of non-interlaced captured content in accordance with one embodiment of the invention.

FIG. 2 shows a system 10 for reconstructing film captured content by analyzing a received interlaced input video stream to determine whether the received interlaced input video stream underwent non-interlaced to interlaced conversion. The system 10 includes a signature generator 12 that receives decoded video image data, such as an interlaced input video stream 14 which may contain suitably captured content. The signature generator 12 also receives end of line data 16 which indicates the end of a horizontal scan line of video so that the signature generator 12 knows which video information corresponds to a given horizontal scan line. The signature generator 12 also receives end of field data 18 indicating when the end of a field has occurred and receives HCOUNT and VCOUNT data for optionally subdividing the field into columns and bands (rows). Hence the field may be suitably divided into region blocks for signature evaluation. The signature generator 12 generates a plurality of field signature values 20 on a per field basis. In this embodiment, the field signature values 20 serve as input to a non-interlaced to interlaced probability generator stage 22.

By way of example, in the case of film image streams, the non-interlaced to interlaced probability generator stage 22 is a film pull down probability data generator stage which includes a signature value shift register 24 for storing sequential signature values 20. Preferably, the signature value shift register 24 includes a same number of registers as a number of fields generated in a film pull down conversion. For example, as shown in FIG. 2, the signature value shift register 24 includes five registers for use in a 3:2 pull down conversion since one original film frame may have three fields and a consecutive frame may be represented by two fields so that two consecutive film frames may be represented by a total of five fields.

The non-interlaced to interlaced probability data generator stage 22 generates noninterlaced to interlaced probability data 26, such as film pull down probability data, based on the plurality of field signature values 20. The non-interlaced to interlaced conversion probability data 26 is used to indicate whether non-interlaced to interlaced conversion occurred based on analyzing image data in the interlaced input video stream. The probability data generator stage 22 includes a non-interlaced to interlaced conversion probability data generator 28, such as a film pull down probability data generator, that receives output from the signature value shift register 24, namely the field signature value for each field. In general, the probability data generator 28 evaluates field signature values 20 continuously on a field-by-field basis such that at each end of field transition, the field signature values 20 are shifted to a subsequent register so that the probability data generator 28 continuously evaluates the field signature values 20 on a per field basis for sequential fields. The probability data generator 28 also receives weighting factors 30 from a control processor (not shown) for use in weighting field signature values as described below.

A non-interlaced to interlaced conversion probability data analyzer stage 32, such as a film pull down probability data analyzer stage receives the non-interlaced to interlaced conversion probability data 26 and analyzes the probability data 26 to determine whether the interlaced input stream 14 was originally created in a non-interlaced manner, such as being originally recorded on film in a progressive manner. Since the probability data 26 is generated based on the signature values 20, the conversion analyzer stage 32, in effect, also analyzes the field signature values 20 to determine whether the interlaced input stream was originally non-interlaced content requiring suitable de-interlacing. The conversion analyzer stage 32 includes a shift register 34 that outputs shifted conversion probability data 26, such as film pull down probability data, to a non-interlaced to interlaced conversion analyzer. The conversion probability analyzer 36 generates reconstruction control data 38, such as film reconstruction data, that serves as control data to an address generator 40 for a de-interlacing frame store 42.

The probability analyzer 36 uses the probability data 26 to determine if over time the expected pattern exists and a level of confidence that the pattern exists, and at which field the pattern starts in the stream of video. If the confidence is above a threshold, a one type of de-interlacing method is selected otherwise a default de-interlacing method is selected. The reconstruction control data 38 is generated to effect the selected de-interlacing method. It will be recognized that the type of de-interlacing method may be any suitable method depending upon the pattern or lack of pattern.

Based on the reconstruction control data 38, the address generator 40 selectively controls where the decoded video image data is stored in the de-interlacing frame store 42 for de-interlacing the interlaced input video stream for proper output to progressive display 44. Accordingly, the frame store 42 stores the field data in an order selected by the conversion analyzer 36 such that only field data from original film frames are woven into a video frame for display in the progressive display device 44. Alternatively, de-interlacing can be controlled by directing field fetch address generation to read stored data alternately line by line from paired fields.

As described, the signature generator 12, the probability data generating stage 22 and the conversion analyzer stage 32 are one embodiment for determining whether the plurality of converted images in the interlaced input video stream underwent non-interlaced to interlaced conversion to identify if the interlaced input video stream was originally recorded progressively. To more efficiently determine whether the interlaced video input stream 14 contains film captured content, the system 10 evaluates the image data but does not store the entire image data for its evaluation. However, if desired, the entire field image data can be stored and compared directly. The system 10 is preferably implemented on a graphics chip that may be used for example with multi-media computers or it may be suitable circuit for use in cable set top boxes or other suitable film reconstruction systems.

The probability data generator 28 receives the plurality of fields signature values 20 from signature value shift register 24 and analyzes the field signature values 20 to determine whether the interlaced input stream 14 was originally recorded on film. Preferably, the probability data generator 28 generates film pull down probability data by evaluating differences in a plurality of field signature values 20 between fields that follow each other and also by evaluating differences between field signature values corresponding to fields that are two fields apart in time. In this way, a type of pattern matching is used to automatically determine whether the input video stream was originally created in a non-interlaced manner.

To facilitate use on various types of input video streams, the non-interlaced to interlaced probability generator stage 22 includes a plurality of selectable non-interlaced to interlaced probability data generating stages, one for each type of expected non-interlaced to interlaced conversion format for video data or for each type of expected pattern. For example, where film pull down conversion is expected, the system 10 may include a separate non-interlaced to interlaced probability data generating stage for NTSC type pull down conversions, a separate non-interlaced to interlaced probability data generating stage for PAL type pull down conversion and a generalized pattern probability generating stage (see FIG. 8a). Through a software user interface, the user can select which of the non-interlaced to interlaced probability data generating stages is used. Alternatively, a separate non-interlaced to interlaced probability data generator stage 22 and separate corresponding conversion analyzer stage 32 may be used for each type of expected conversion format.

Figure 3:
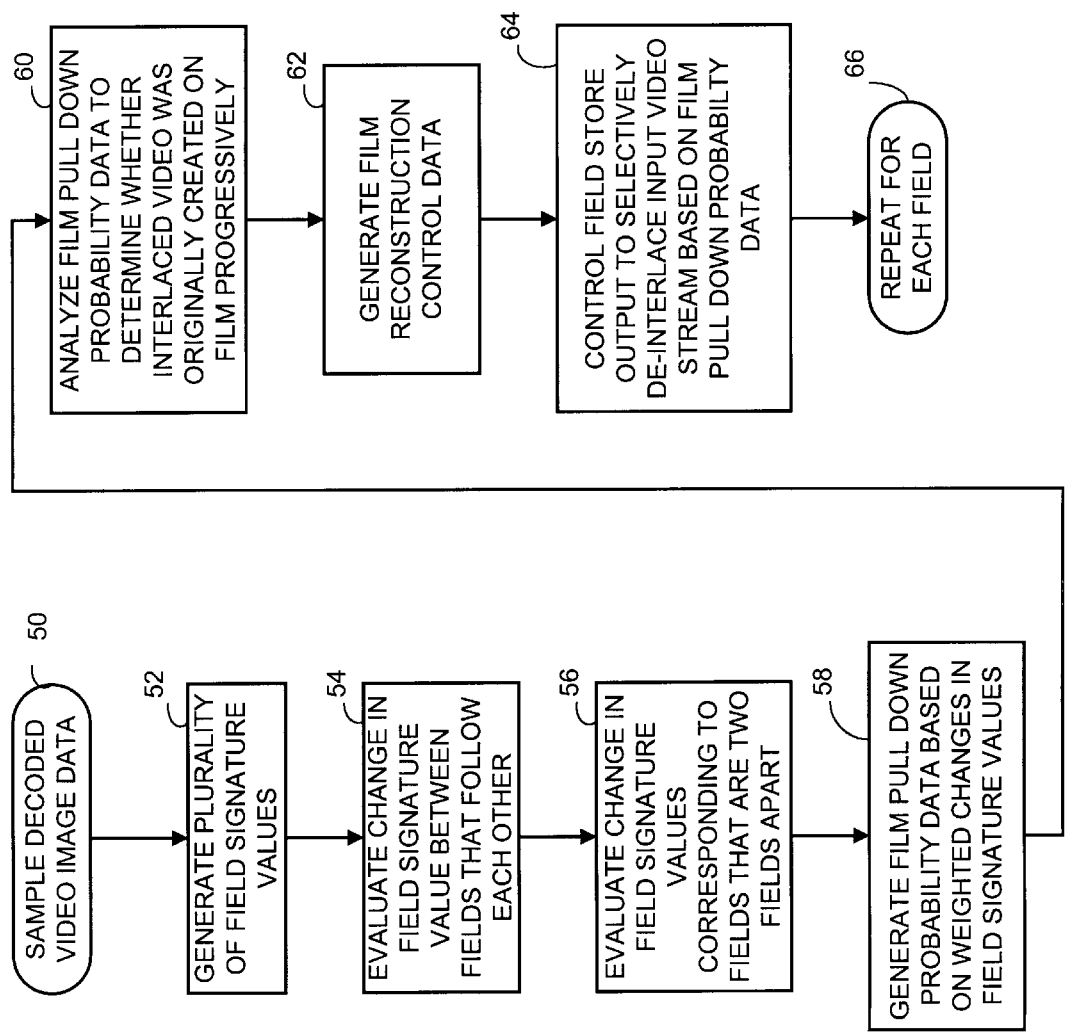
FIG. 3 is a flow diagram generally illustrating operation of the system of FIG. 2.

FIG. 3 shows the general operation of the system 10 as applied to an input video stream containing film captured content being evaluated to see if it has undergone NTSC 3:2 pull down conversion. The signature generator 12 samples decoded video image data 14 as shown in block 50. The signature generator 12 generates a plurality of field signature values 20 on a field-by-field basis as indicated in block 52. The film pull down probability data generator stage 22 assesses probability values based on changes in field signature values between fields that follow each other shown in block 54 and it evaluates changes in field signature values corresponding to fields that are two fields apart as shown in block 56. The film pull down probability data generator stage 22 generates the film pull down probability data 26 based on the field signature value 20 as shown in block 58.

Film pull down analyzer stage 32 analyzes the pull down probability data 26 to determine whether interlaced video was originally recorded on film. This is shown in block 60. The film pull down analyzer 36 then generates film reconstruction control data 62 to effect proper sequencing and grouping of fields by generating film reconstruction control data 38. The film reconstruction control data 38 serves as input to the address generator 40 which in turn controls the de-interlacing frame store 42 to selectively de-interlace the input video stream 14 based on the film pull down probability data 26 as shown in block 64. This process is repeated for each field continuously as shown in block 66.

Figure 4A:
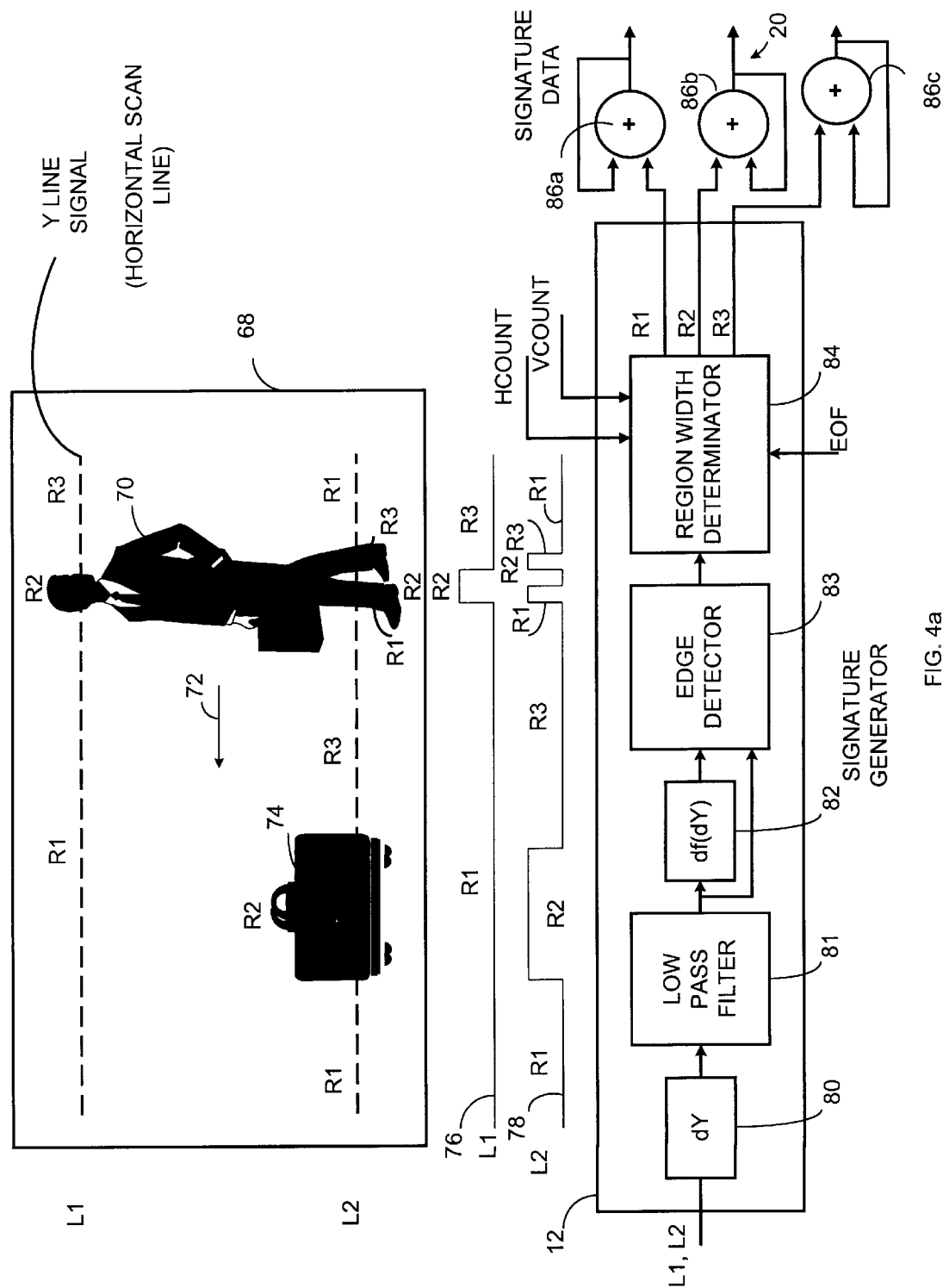
FIGS. 4a and 4b are a block diagram and graphic illustrations generally depicting a signature generator and region definition scheme in accordance with one embodiment of the invention.

FIG. 4a graphically illustrates one embodiment of how the signature generator 12 evaluates the interlaced video input stream image data to generate signature data 20. The signature generator 12 divides portions of image data, such as scan lines, into regions and generates region values based on fluctuations in pixel data. The signature generator combines region values to create a signature value from the region values. As an example, if an even field 68 (or odd field) includes a man 70 walking in the direction of arrow 72 toward a stationary suitcase 74, the signature generator 12 evaluates each Y line signal (L1, L2 through Ln). The Y line signal is the same as a horizontal scan line. The signature generator 12 divides each horizontal scan line into a number of regions such as three regions R1, R2 and R3, wherein a region may be selected change in pixel data and preferably is a change in luminance data within the horizontal scan line of image data. The luminance signal for scan lines L1 and L2 are generally indicated by reference numerals 76 and 78.

Scan line L1 for field 68 is represented by luminance signal 76 showing luminance for region R1 to be constant up to the point where the man's head begins. The change in luminance at the man's head starts region R2. Region R2 continues until the next luminance level changes such as at the end of the man's head where region R3 begins. Likewise, luminance signal 78 for scan line L2 is indicative of the luminance changes along scan line L2. The luminance changes at the beginning of the suitcase 74 which begins region R2. Region R3 begins at the end of the suitcase 74. A second region R1 begins again for luminance line L2 at the edge of the man's leg and continues as shown so that three region R1's are represented by horizontal scan line L2, two region R2's are represented by horizontal scan line L2 and two region R3's are represented by horizontal scan line L2.

The signature generator 12 receives the luminance signals 76 and 78 and includes a derivative stage 80, a low pass filter 81 to remove extraneous noise, a second derivative stage 82, and edge detector 83 and a region width determinator 84. The edge detector 83 receives the filtered luminance signal and the output from the second derivative stage and compares the signals to detect each edge to define regions R1, R2 and R3. The output from the edge detector 83 is received by the region width determinator 84 which determines the width of each region (block) on a scan line by scan line basis for a given field 68. To determine the region width on a block by block basis, the region width determinator 84 also receives end of field data, horizontal scan line (HCOUNT) data and vertical scan line (VCOUNT) data. The HCOUNT and VCOUNT data are used to define the horizontal and vertical size of each region or block. It has been found that noise can cause inadvertent edge detections and breaking fields into columns can help reduce the effect of the noise.

Figure 4B:
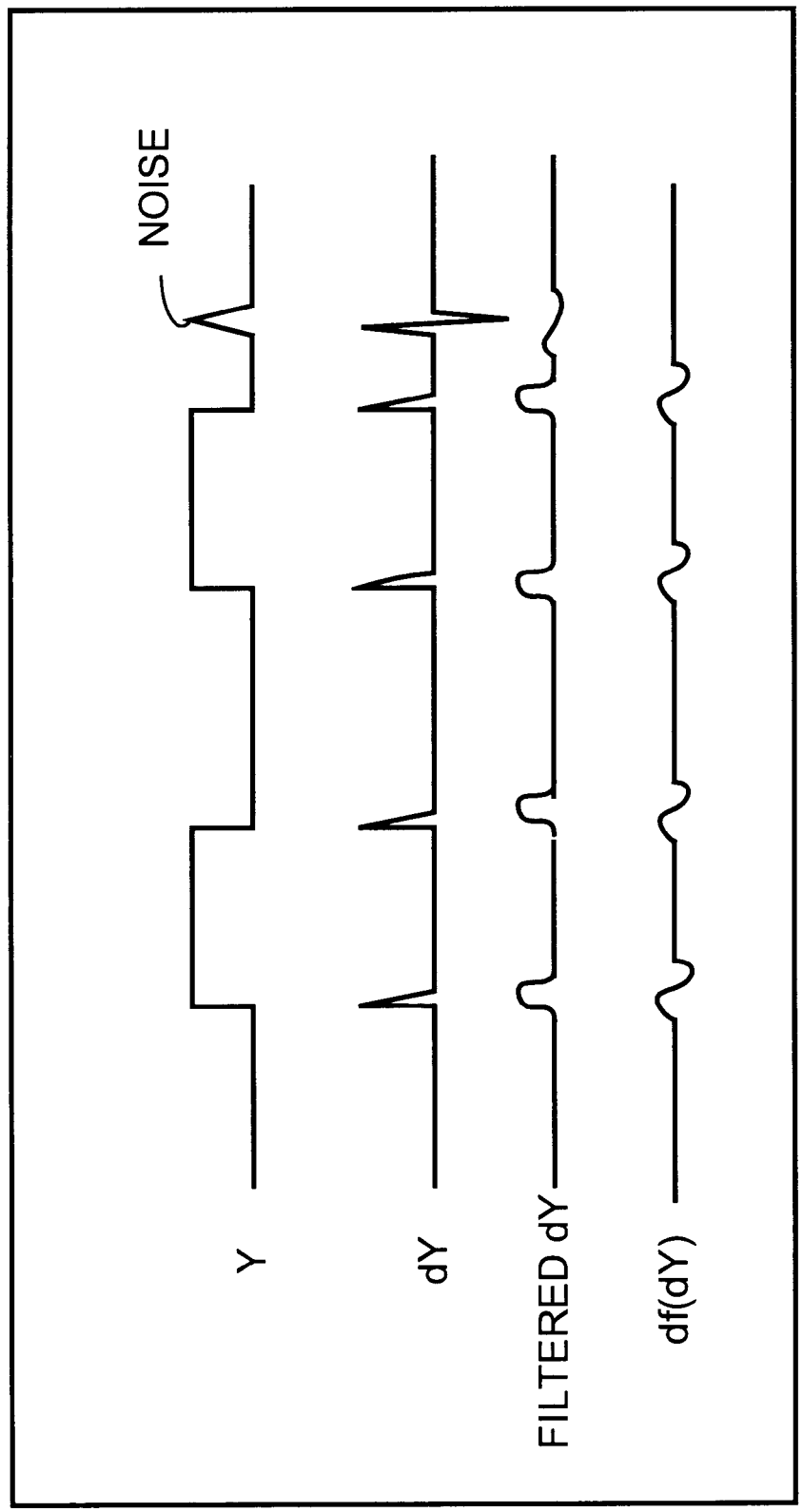

Referring to FIG. 4b, the signature generator preferably obtains the derivative of Y, (dY), filters the resulting data and obtains the derivative of f{dY}, d(f{dY}), and analyzes the resulting data for a sign change coincident with the magnitude of f{dY} exceeding a threshold. A sign change indicates a change in luminance data or edge. The threshold may be any suitable threshold depending on the desired accuracy and noise in the image data.

The resulting width determinations for each region (block) R1, R2, R3 are summed for the total of all scan lines in the field as indicated by summing stages 86A, 86B and 86C. The field signature value 20 for each field are output from the summing stages 86A through 86C.

In the following frame when the man 70 moves in direction of arrow 72, the region value R1, R2 and R3 will change indicating a change in horizontal motion. In the case where field 68 is the same as another field, as may occur in a 3:2 pulls down conversion, the signature data would be substantially identical for those fields.

Hence, the region width determinator is responsive to the Y coordinate video image data or horizontal scan line information and determines region values in a horizontal scan line on a per field basis and sums the corresponding region values to generate the signature value 20. Because the same regions are summed for a given field for the signature value from one field to another field, a change in signature values indicates a change in horizontal video motion between sequential fields. It will be recognized that regions may be other than luminance changes in horizontal scan lines and that a field may be divided in any suitable manner. For example, data within a field may be divided into specified blocks and other pixel parameters other than luminance fluctuations may be used.

As an alternative embodiment, the system 10 may generate the non-interlaced to interlaced probability data based on a direct comparison of pixel data between sequential frames. For example, the system may store pixel data form sequential frames and compare the frames on a pixel by pixel basis to determine if a change in motion occurred.

Figure 5:
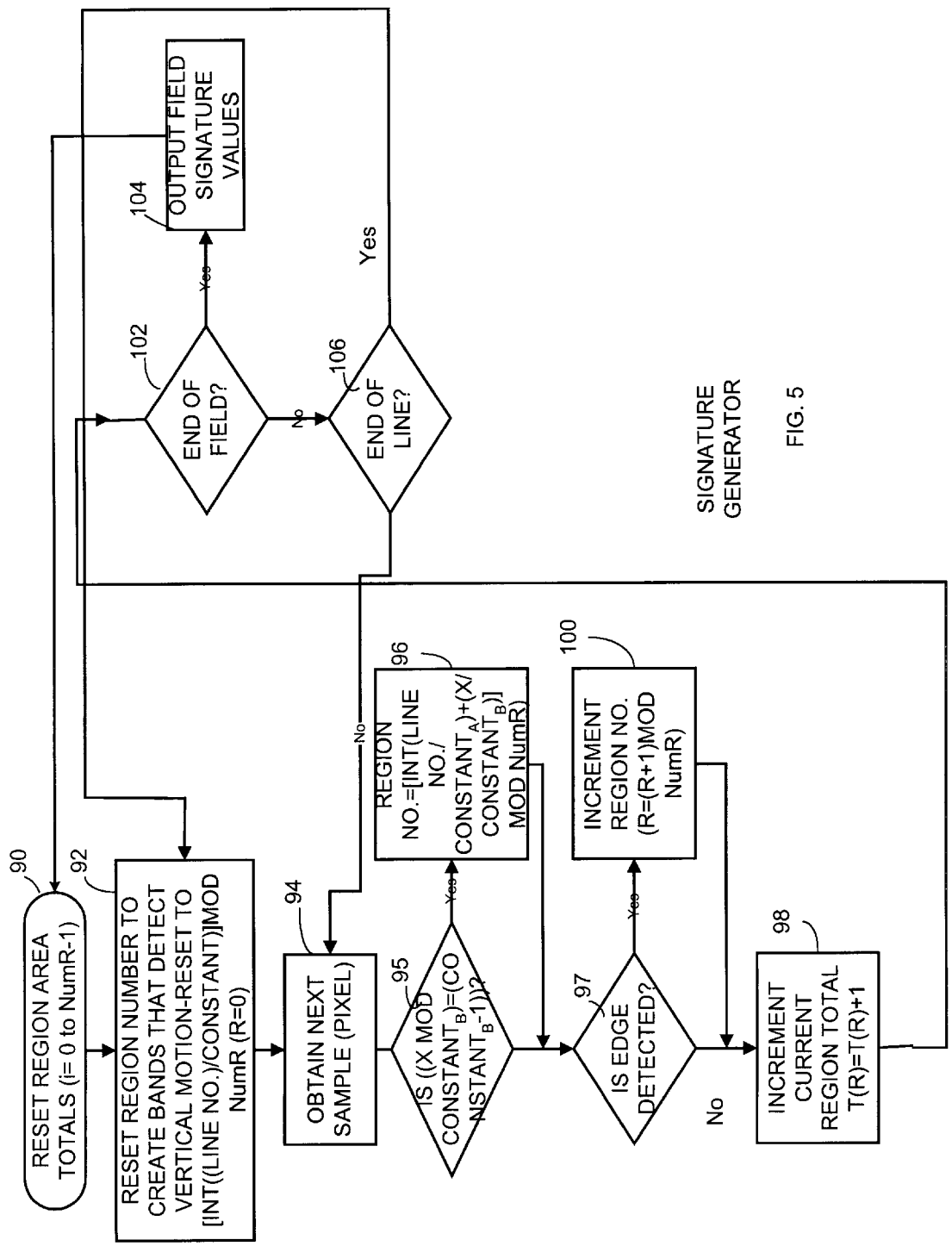
FIG. 5 is a flow diagram generally depicting the operation of the signature generator of FIG. 2 in accordance with one embodiment of the invention.

FIG. 5 shows one example of the operation of the signature generator 12 wherein the signature generator resets region area total counters upon initialization as shown in block 90. An image is divided into a grid to help improve sensitivity to motion. Use of a grid had been found to improve motion detection sensitivity. At the leading edge of each area defined by the grid, the region number is set to a predefined value. Accordingly, detected edges in the scene can change the region number, but the area affected is limited by the boundaries defined by the grid.

In block 92, the signature generator 12 resets a region number counter to create bands that help to detect vertical motion. Hence the image is divided into a number of horizontal bands, each band "Constant A" high. The signature generator 12 then obtains the next pixel sample as shown in block 94. In block 95 the signature generator determines if the signature generator has reached the end of a column. If it has reached the end of a column, the region number is reset to a predetermined region number based on the column number and row number as shown in block 96. This limits the amount that edges in image data can redistribute an area between different regions. Blocks 92 and 96 also select the region number each grid rectangle starts with and block 92 helps the signature generator to detect vertical motion by increasing the likelihood that a vertically moving object in a scene will redistribute area from one region to a different region. The edge detector 82 determines whether a pixel sample or group of pixel samples have fluctuated beyond a desirable threshold resulting in an edge occurrence as shown in block 97. This is performed based preferably on luminance information, however other suitable information may be used. If no edge has been detected, the signature generator increments the total region width as shown in block 98. If however an edge is detected, the signature generator 12 increments the region number counter to the next region as shown in block 100. The region total for that new region is then incremented as shown in block 98.

Once the region has been incremented, the signature generator determines whether an end of field has occurred as shown in block 102. If an end of field has occurred, the signature values for each of the regions are output to the film pull down probability data generator stage as shown in block 104. If however the end of a field has not occurred, the signature generator 12 determines whether an end of line has occurred as shown in block 104. If an end of a line has occurred, the region number is reset as shown in block 92 and the process continues. If however the end of a line has not occurred, the signature generator obtains the next pixel sample as shown in block 94 and continues the process. The signature values are compared in the probability data generator as a part of field pattern matching to determine if, for example, the input video stream has been converted by a 3:2 pull down conversion prior to transmission. The difference in signature values preferably represents a change in motion between fields. The change in motion between fields becomes important when a change in motion can serve as a probability indicator for use in determining whether the input video stream has undergone non-interlaced to interlaced conversion.

Figure 6:
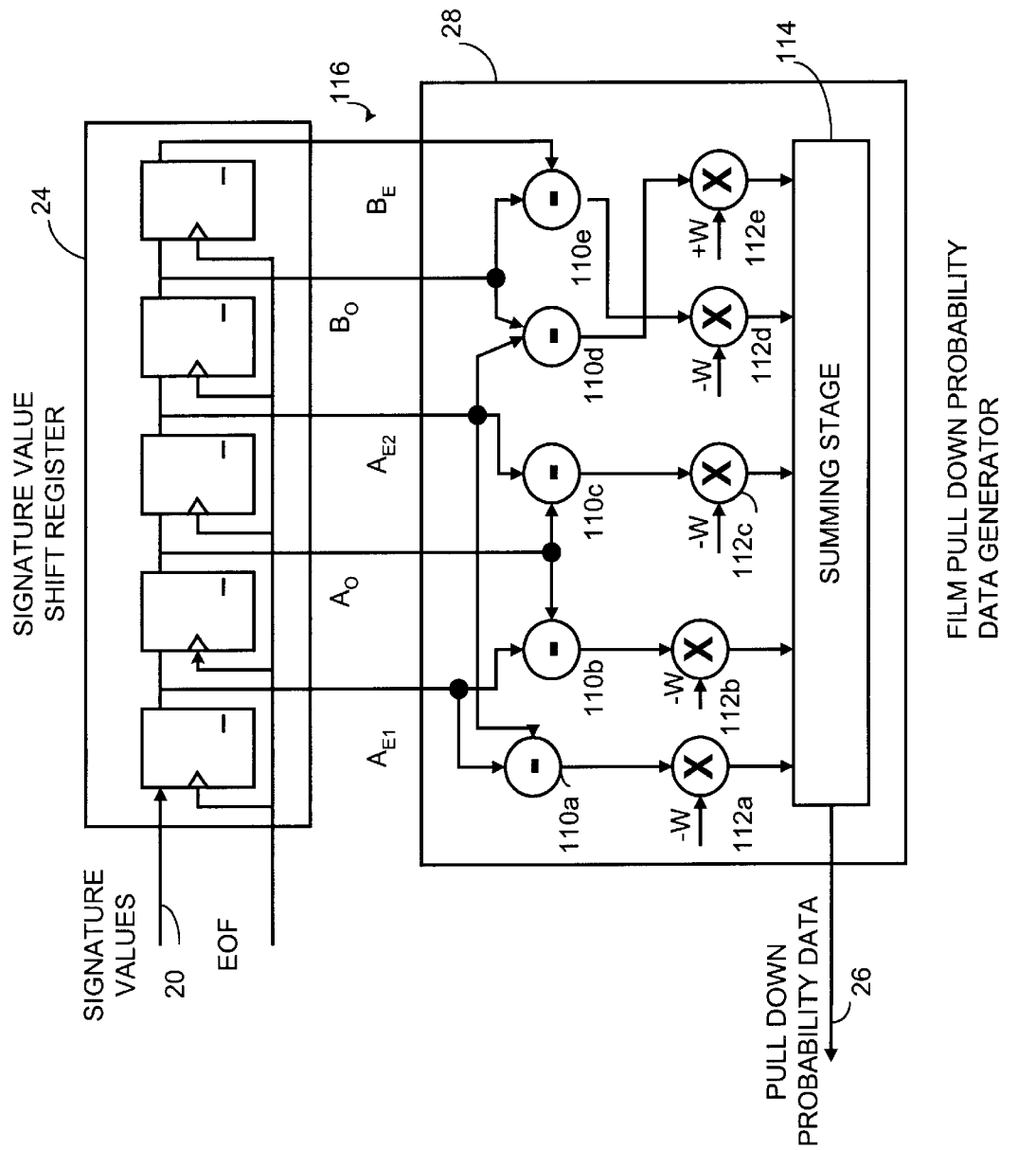
FIG. 6 is a block diagram generally illustrating a non-interlaced to interlaced probability data generator of FIG. 2 in accordance with one embodiment of the invention.

To illustrate, FIG. 6 shows the probability data generator 28 configured for determining whether the interlaced video input video stream has undergone NTSC type 3:2 film pull down conversion. If input video has undergone 3:2 pull down conversion, an expected pattern of fields would be ($A_{E1}$, $A_O$, $A_{E2}$, $B_O$, $B_E$). The probability data generator 28 combines signature values to determine whether the input video stream includes a predetermined field pattern matching the 3:2 pull down pattern.

The probability data generator 28 includes a series of subtracting stages generally shown as subtractors 110A–110E. The probability data generator 28 also includes a series of multiplication stages 112A–112E for receiving the subtracted output from each of the subtractors 110A–110E, respectively. The multiplication stages 112A–112E utilize positive and negative weighting values (−W and +W) and multiply the weighting factors with the net difference from the subtractor stages 110A–110E and output the resulting values to a summing stage 114 where the values are summed to form the pull down probability data 28.

As shown, an original film frame A and original film frame B have corresponding signature values for even fields ($A_{E1}$, $A_{E2}$, $B_E$) and odd fields ($A_O$ and $B_O$) from the signature value shift generator 24. These are generally indicated by arrow 116. If a 3:2 pull down conversion has occurred, the fields for consecutive frames should be arranged in a 3:2 pattern as shown in FIG. 6. To determine whether input video is in the 3:2 pattern, the film pull down probability data generator 28 evaluates differences in field signature values by generating the weighted values magnitude of differences between fields that follow each other and by generating weighted values differences between field signature values that correspond to fields that are two fields apart and by summing the weighted values.

For example, signature values for fields that follow each other such as field $A_E$ and $A_O$ are compared in subtractor 110B. The magnitude of the resulting difference is weighted by a negative weighting factor in multiplier 112B. A negative weighting factor is used because a large difference reduces the likelihood of a pattern match.

Adjacent fields $A_{E2}$ and $B_O$ between potential differing frames A and B are compared in subtractor 110D. The resulting comparison of fields from adjacent fields of different original film frames are then weighted by weighting factor +W as shown in multiplication stage 112E. A positive weighting factor is used because a difference is expected and reinforces the conclusion that the 3:2 pattern exists. This particular comparison is important for distinguishing between video that has no motion, and video that has undergone a 3:2 pull down.

The film pull down probability generator 28 also generates weighted values of differences between field signature values that correspond to fields that are two fields apart such as the two even fields from frame A ($A_{E1}$ and $A_{E2}$). The signature values for these fields are compared in subtraction block 110A. This facilitates determination of whether there is a 3:2 pull down since the field signature values for $A_{E1}$ and $A_{E2}$ should be almost exactly the same, except for noise, if they come from the same original frame. If the signature values for the fields represent the pattern as shown, a difference from subtractor 110A would be nearly zero. When the field pattern is as expected, the magnitude of the difference from subtractor 110D is then weighed by a negative weighting factor. Preferably, the following weighting factors may be used: −1 for output from subtractor 110*b*, 100*c*, and 110*e*, a −4 for output from subtractor 110*a* and +2 for output from subtractor 110*d*. The system 10 de-interlaces by generating a weave, two field bob, single field bob, interlace emulation, or combinations of these techniques.

Figure 7:
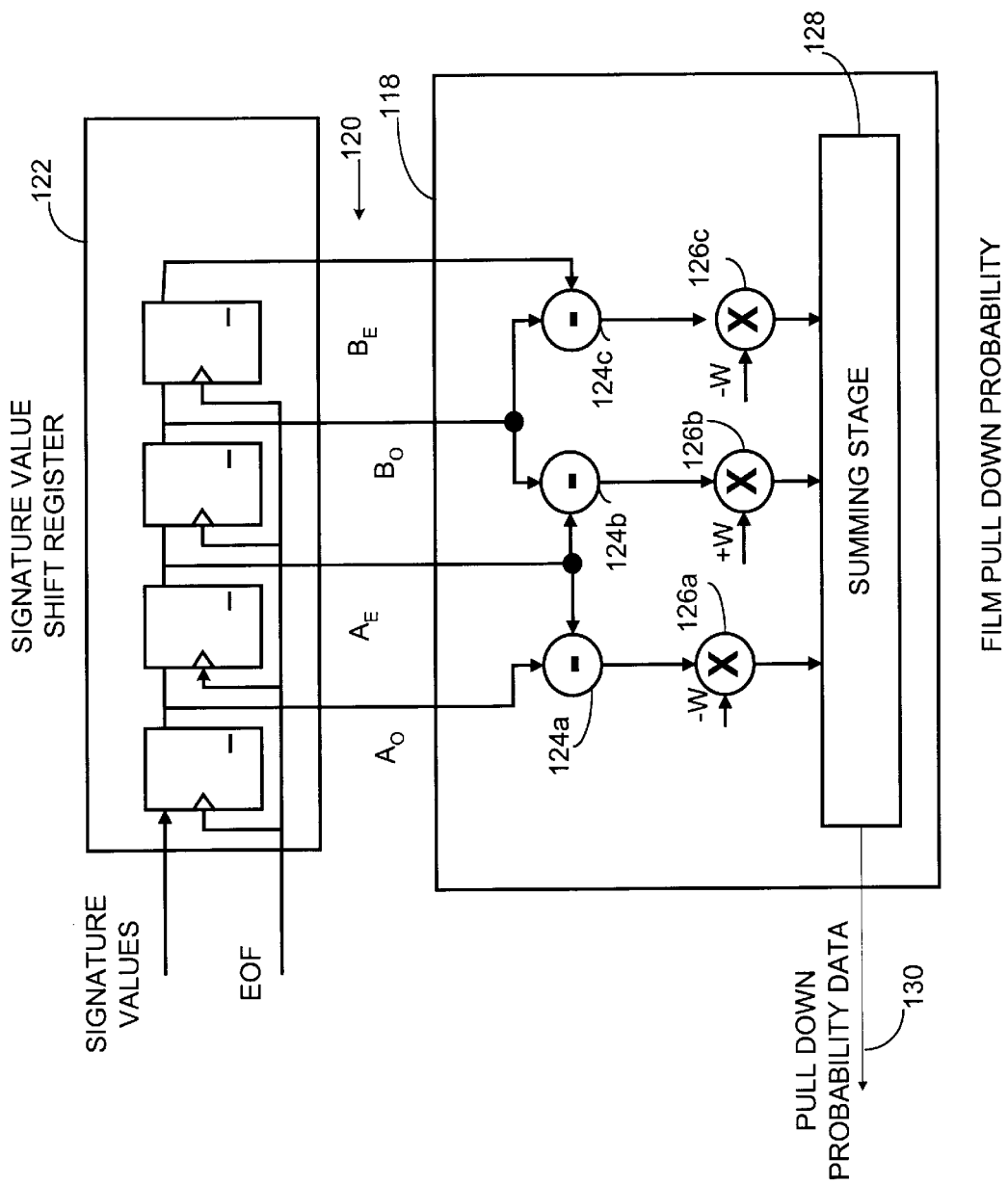
FIG. 7 is a block diagram generally representing another embodiment of a non-interlaced to interlaced probability data generator in accordance with the invention.

Similarly, FIG. 7 shows a configuration for a film pull down probability data generator 118 for determining whether the input video stream has undergone PAL type 2:2 pull down conversion by evaluating signature values from two sets of sequential fields and comparing the signature values to a predetermined threshold. Since PAL pull down conversion uses a 2:2 conversion, two fields are generated for each frame as shown by reference arrow 120. The signature value shift register 122 includes four shift registers corresponding to the number of expected conversion fields for a set of sequential film frames. The film pull down probability data generator 118 compares weighted values of the magnitude of differences between fields that follow each other. For example, fields $A_O$ and $A_E$ are compared in subtracting block 124A whereas adjacent fields $A_E$ and $B_O$ are compared in subtracting stage 124B and adjacent fields $B_O$ and $B_E$ are compared in subtracting stage 124C. The differences from subtracting blocks 124A–124C are weighted in multiplication blocks 126A–126C. The weighting factor of multiplication block 126B is given a +W weighting factor, such as +2, since it receives output from an expected transition between film frames, namely fields $A_E$ and $B_O$ from subtraction block 124B. The weighting factor of multiplication blocks 126A and 126C are given a −W weighting factor, such as −1. Summing stage 128 sums the output values from the multiplication stages 126A–126C to generate pull down probability data for a PAL type conversion 130.

FIG. 8*a* shows a more generalized pattern probability generator and probability analyzer with adaptive de-interlacing determinator 132 that evaluates signature values from fields that are one field apart and fields that are two fields apart. This pattern probability generator and probability analyzer 132 is another configuration of probability generator 22 and probability analyzer (and de-interlacing method determinator) 32 and can be used in addition to 3:2 or 2:2 pull down probability data generators and analyzers. The signature values 20 are input to a two shift register separation stage 134 that subtracts signature values from fields that are one field apart and signature values from fields that are two fields apart. Each output is passed to a shift register stage 136 and 138 respectively. The number of shift registers in the shift register stages 136 and 138 can be any suitable length, but should be long enough to allow analysis over a sufficient number of fields to make a determination as to whether a field pattern likely exists. A one field spacing frequency analyzer 140, such as a fast Fourier transform (FFT) block analyzes the magnitude of differences of the signature values from the shift register stage 136 of fields that are one field apart an generates an output signal 143*a* which indicates if a repeating pattern exists at any given period, and the phase of such a pattern. Similarly, a two field spacing frequency analyzer 142, such as another fast Fourier transform (FFT) block analyzes the magnitude of differences of the signature values from the shift register stage 138 of fields that are spaced two fields apart an generates an output 143*b* which indicates if a repeating pattern exists at any given period, and the phase of such a pattern. The outputs 143*a* and 143*b* serve as inputs to the de-interlacing method determinator 173.

The magnitude of signature differences is used to determine whether a pattern exists so that preferably the magnitude of differences is expressed prior to the frequency analysis. The magnitude of the differences may be expressed, for example, as:

$$\frac{1}{|S_{i+n} - S_i|}$$

where S is a signature and n is either a 1 for one field spacing or a 2 for two field spacing.

The generalized pattern probability generator and probability analyzer 132 can be used to determine whether a scene has motion or no motion or whether the device providing the video stream is paused. A paused image is determined by detecting no motion between even fields and no motion between odd fields and by detecting that the even and odd fields are different. Further, the pattern probability generator and probability analyzer 132 determines whether the device providing the video stream is playing slow motion playback such as for a sports event, by detecting that there is no motion for several fields and then detecting a sudden substantial change in motion. Also, the pattern probability generator and probability analyzer 132 determines whether there is some other arbitrary pull down such as in the case of animated film in the same way.

Based on the output from the one field/two field spacing frequency analyzers 140 and 142, an analysis is made of the frequency analyzer 140 and 142 outputs 143*a* and 143*b*, to determine a type of pattern and proper de-interlacing methodology. There are "even to even"/"odd to odd" field differences for fields that are two fields apart as well as "even to odd"/"odd to even" field differences for fields that are one field apart. Both types are analyzed. The results from both analyses are used to establish the most likely pattern. The existence of a pattern can be determined by performing a frequency analysis on the field differences. Identifying a pattern of large differences separated by small differences indicates that a pattern of repeated images was occurring and also reveals how many repeats there were before the image changed.

To determine whether to weave or otherwise combine either a previous or next opposite field with the current field, several criteria are considered. For example, the system determines whether the de-interlacing selection follows an established pattern of previous selections or whether the selection breaks the pattern. The system also evaluates the number of fields that maintain the pattern up to the current field. The system also determines if the detected pattern is a pattern that is considered likely for the particular video stream. Likely patterns may be input by a user or other source that configures the analyzers 140 and 142.

Figure 8B:
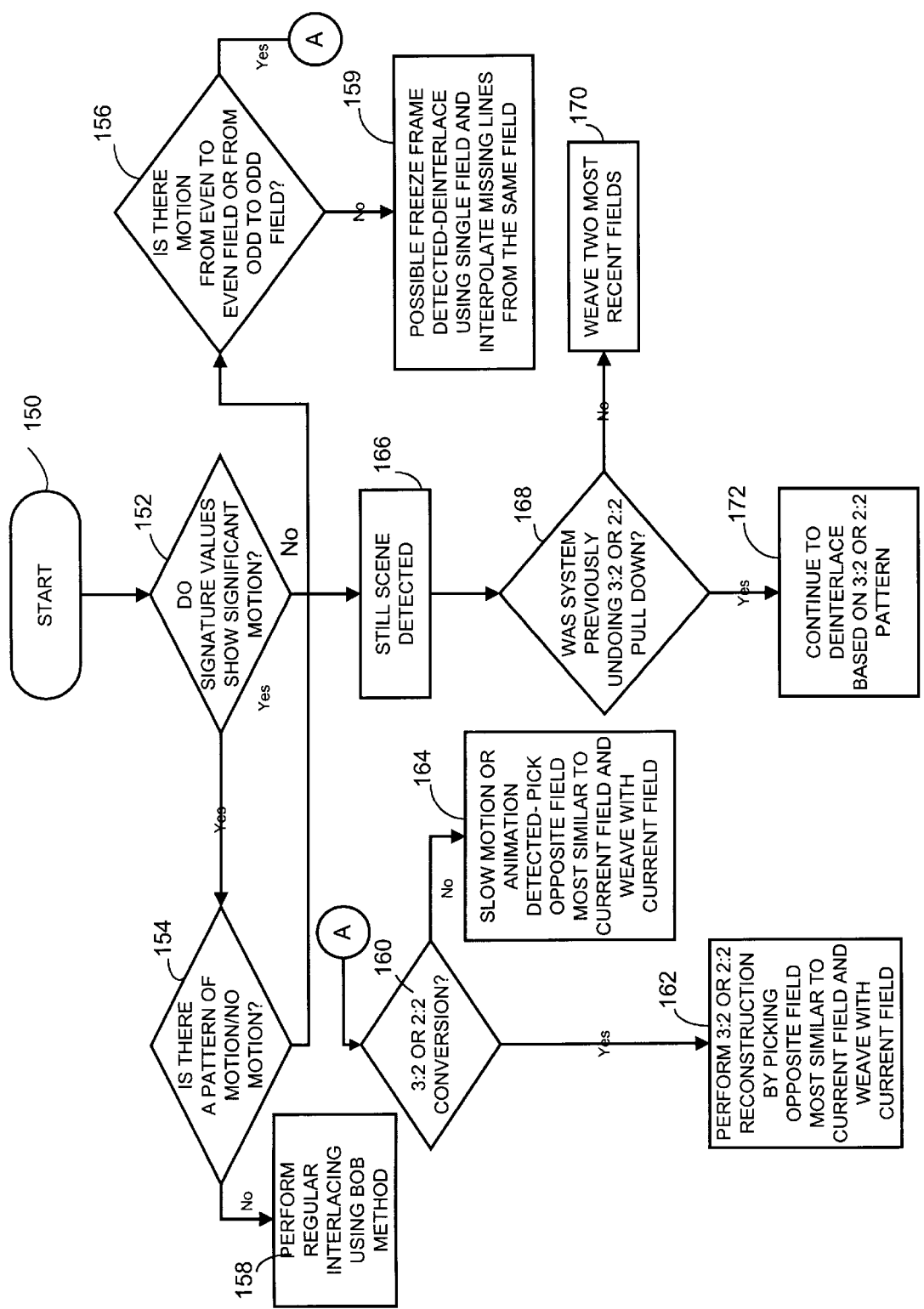
FIG. 8b is a flow diagram generally depicting the operation of one embodiment of the invention that detects freeze frames, slow motion playback and other image patterns.

Referring to FIG. 8*b* the de-interlacing method determinator 173 receives outputs 143*a* and 143*b* for determination as indicated by block 150. The de-interlacing method determinator 173 determines that the video stream contains motion, as indicated in block 152, if there are frequency terms that exceed a pre-selected set of thresholds. Of these, the lowest order term which is called the DC term, which is made by averaging all of the data values 136 or 138, is generally the most significant motion indicator. If significant motion is detected, the de-interlacing method determinator 173 evaluates outputs 143*a* and 143*b* to determine whether there is a pattern of no motion/motion (block 154) and furthermore if motion is occurring from even field to even field or from odd to odd field as shown in block 156.

A pattern of differences between fields such as no motion/motion is indicated if a particular frequency term is larger than normal. If no motion is occurring from even to even fields and from odd to odd fields, but the even and odd fields are different then the two field spacing analyzer will show no motion while the one field spacing analyzer will show motion.

As shown in block 158, if there is not a pattern of no motion/motion, the de-interlacing method determinator 173 outputs reconstruction control data to perform regular interlacing using a bob type method that does not combine fields. If motion is detected but it is not from even to even or from odd to odd fields, the system detects a pause condition as shown in block 159 and de-interlaces using a current single field and performs conventional interpolation of missing lines from the same field. Where the video stream is detected as being paused, the de-interlacing includes weaving if the even and odd fields look the same from the signature data, or a single field bob can be used where only an odd field or even field is displayed. However, the system does not alternate between the even and odd fields. Otherwise, if there is a pattern of no motion/motion, including motion from even to even and odd to odd fields, a determination is then made as to whether the pattern likely represents a 3:2 or 2:2 pull down conversion pattern as shown in block 160.

Referring to FIG. 8*c*, an example of difference data (118261292810 and 08979077980) input to frequency analyzers 140 and 142 derived form video created by 3:2 pull down converted film. The magnitude of the differences are shown as a string of numbers and the bar graphs depict the magnitude of frequency terms resulting from frequency analysis of the difference data. The DC term and phase data is not shown. The existence of a larger than normal term 5 in the two field spacing analyzer and the larger than normal terms 2 and 3 in the one field spacing frequency analyzer are indicative of 3:2 pull down converted film. In addition, input from a user, and the prior existence of a 3:2 indication can be factored in to determine the probability that the current video content is film that underwent 3:2 pull down or 2:2 pull down conversion.

Referring back to FIG. 8b, the film probability analyzer and determinator for the 3:2 or 2:2 pattern then outputs the film reconstruction control data to pick an opposite field most similar to the current field and weaves the opposite most similar to the current field with the current field, as shown in block 162. If no 3:2 or 2:2 conversion is detected, the de-interlacing method determinator 173 determines that the video stream contains slow motion video images and de-interlaces using an opposite field most similar to the current field and weaves the fields together as indicated by block 164.

Referring back to block 152, if the analyzer 140 and 142 outputs do not indicate significant motion, the computer determines that a still scene is present in the video stream as shown in block 166. The de-interlacing method determinator 173 then determines whether the system was previously undoing 3:2 or 2:2 pull down by referring to a record of what type of de-interlacing is or was occurring as shown in block 168. If no reconverison is being done, the system weaves the two most recent fields as shown in block 170. If the system was previously undoing 3:2 or 2:2 pull down, the system continues to de-interlace accordingly as indicated by block 172.

Accordingly, the system 10 with the pattern probability generator and analyzer 132 determines video stream content using the signature generator that generates a plurality of field signature values on a per field basis. The pattern probability generator and analyzer 132 determines whether the input video stream contains a paused image; and the output data 143a and 143b, to the computer to control the address generator and de-interlacing frame or field store 42 to selectively de-interlace the interlaced input video stream based on analysis of field patterns. The output from the shift registers serves as pattern probability data. The pattern probability generator and analyzer 132 compares field signature values from adjacent fields and two fields apart and analyzes the differences over time to determine if any pattern exists.

The system 10 with the pattern probability generator and analyzer 132 also facilitates determining whether an input video stream contains slow motion playback images. The information from the pattern probability generator and analyzer 132 is used for selectively de-interlacing the interlaced input video stream based on analysis of field patterns. If desired, the pattern probability generator and analyzer 132 may be used independently of determining whether the input video stream has undergone non-interlace to interlace conversion. For example, where only detection and de-interlacing of either a paused image or slow motion images is desired, only the pattern probability generator and analyzer 132 need be used.

Figure 9:
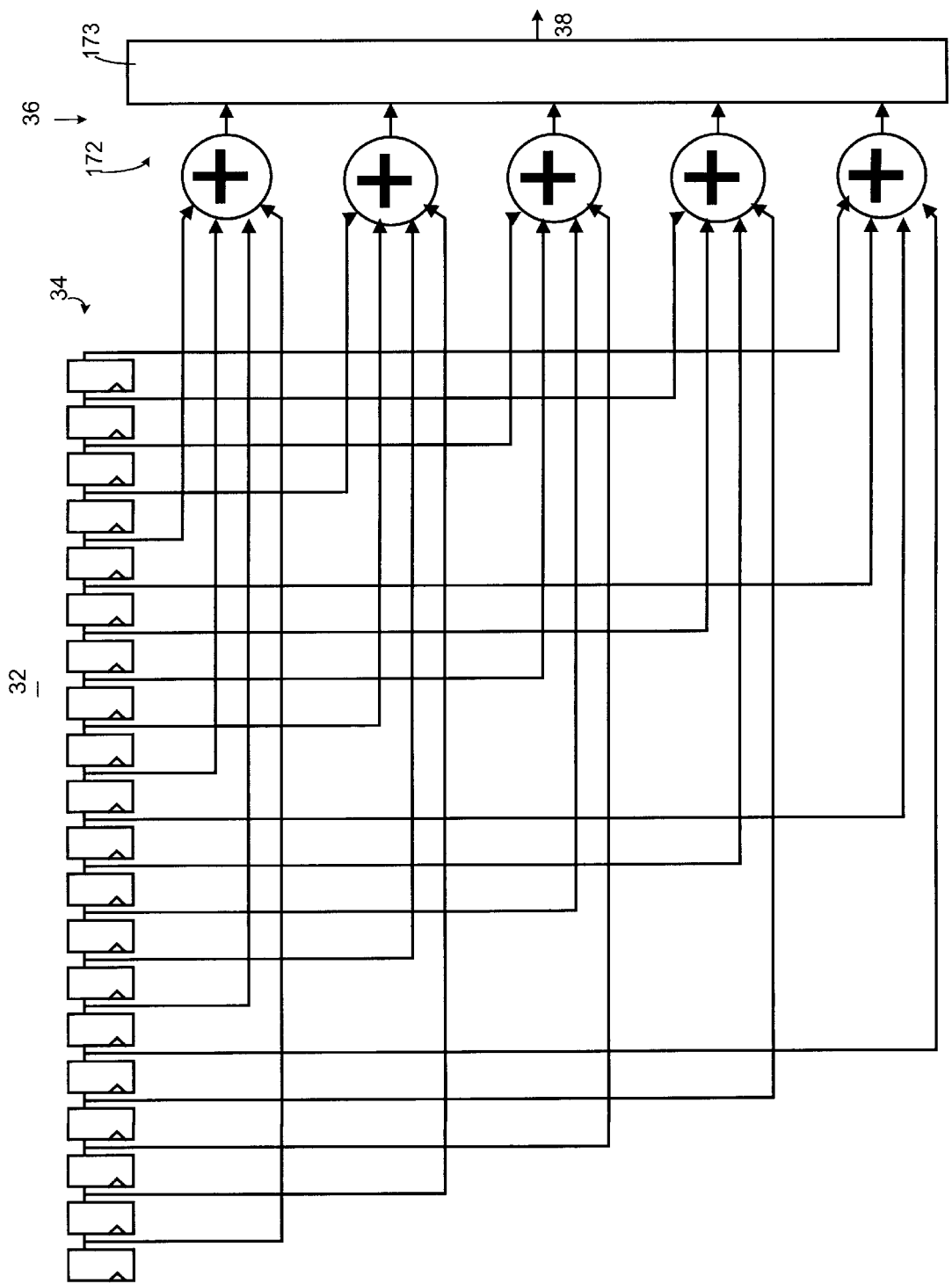
FIG. 9 is a block diagram depicting another embodiment of a probability generator and analyzer in accordance with the invention.

FIG. 9 depicts an example of a 3:2 non-interlaced to interlaced conversion probability data analyzer stage 32 with outputs from the shift registers 34 connected to probability analyzer stage 36. Probability analyzer stage 36 includes summing stages 172 and de-interlacing method determinator 173. The de-interlacing method determinator 173 uses outputs of the summer 172 to determine if over time the expected pattern exists and a level of confidence that the pattern exists, and at which field the pattern starts in the stream of video. If the confidence is above a threshold, one type of de-interlacing method is selected otherwise a default de-interlacing method is selected. The confidence level is determined by determining how much larger the largest summed output is compared to the remaining summed outputs. The de-interlacing method determinator 173, may be a microprocessor or other suitable logic. The largest summed output indicates which fields in a video sequence that the 3:2 pattern starts on. An even/odd field signal input facilitates tracking of which fields in the group are even fields and which are odd fields.

In sum, the system 10 analyzes the video stream over time to determine if the video stream contains patterned images and compares adjacent and "two apart" fields either directly or indirectly using signatures or a pixel to pixel comparison. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A system for reconstructing a plurality of converted images of non-interlaced captured content, from an interlaced input video stream that does not contain pre-coded conversion status data, for display on a progressive screen comprising:

means for determining whether the plurality of converted images in the interlaced input video stream underwent non-interlaced to interlaced conversion to identify if the interlaced input video stream was originally recorded progressively by generating non-interlaced to interlaced probability data indicating whether non-interlaced to interlaced conversion occurred based on analyzing image data in the interlaced input video stream; and means, responsive to the non-interlaced to interlaced probability data, for selectively de-interlacing the interlaced input video stream.

2. The system of claim 1 wherein the means for determining generates a plurality of field signature values on a per field basis and includes means, responsive to the plurality of field signature values, for generating the non-interlaced to interlaced probability data.

3. The system of claim 2 wherein the means for determining includes means, responsive to the non-interlaced to interlaced probability data, for analyzing the non-interlaced to interlaced probability data to determine whether the interlaced input stream was originally created on film progressively.

4. The system of claim 1 wherein the means for determining generates the non-interlaced to interlaced probability data based on a direct comparison of pixel data between sequential frames.

5. The system of claim 2 wherein the means for determining generates the non-interlaced to interlaced probability data by evaluating differences in the plurality of field signature values between fields that follow each other and also by evaluating differences between field signature values corresponding to fields that are two fields apart in time.

6. The system of claim 2 wherein the means for generating the non-interlaced to interlaced probability data includes a plurality of selectable non-interlaced to interlaced probability data generating stages.

7. The system of claim 5 wherein the means for determining evaluates differences in field signature values by generating weighted values of magnitude of differences between fields that follow each other and by generating weighted values of differences between field signature values that correspond to fields that are two fields apart and by summing the weighted values.

8. The system of claim 2 wherein the means for determining generates the plurality of signature values by determining changes in luminance data within at least one horizontal scan line of image data.

9. The system of claim 1 wherein the means for selectively de-interlacing includes means for generating film reconstruction data including a frame storage device for storing field data in an order selected by the means for determining such that only field data from original film frames are interlaced into a video frame for display on the progressive display device.

10. The system of claim 2 wherein the means for determining includes means for dividing portions of image data into regions and generating region values based on fluctuations in pixel data and means for combining region values to create a signature value from the region values.

11. The system of claim 10 wherein the means for dividing includes region width determination means, responsive to Y coordinate video image data, for determining region values within a horizontal scan line on a per field basis and for summing corresponding region values to generate the signature values.

12. The system of claim 7 wherein the means for determining also determines whether the interlaced input video stream has undergone NTSC type or PAL type pull down conversion by evaluating signature values from sequential fields and comparing the signature values to a predetermined threshold.

13. The system of claim 2 wherein the means for determining includes means, responsive to the non-interlaced to interlaced probability data, for analyzing the non-interlaced to interlaced probability data to determine whether the interlaced input stream contains a paused image.

14. The system of claim 2 wherein the means for determining includes means, responsive to the non-interlaced to interlaced probability data, for analyzing the non-interlaced to interlaced probability data to determine whether the interlaced input stream contains slow motion playback images.

15. A system for reconstructing a plurality of converted images of non-interlaced captured content, from an interlaced input video stream that does not contain pull down conversion status data, for display on a progressive screen comprising:

means for determining whether the plurality of converted images in the interlaced input video stream underwent non-interlaced to interlaced conversion to identify if the interlaced input video stream was originally recorded on film, by generating a plurality of field signature values on a per field basis as non-interlaced to interlaced probability data, based on analyzing image data in the interlaced input video stream by evaluating differences in field signature values between fields that follow each other and also by evaluating differences between field signature values corresponding to fields that are two fields apart in time wherein the field signature values are based on dividing portions of image data into regions and generating region values based on fluctuations in pixel data and means for combining region values to create a signature value from the region values;

means, responsive to the plurality of field signature values, for generating non-interlaced to interlaced probability data by evaluating differences in field signature values by generating weighted values of the magnitude of differences between fields that follow each other and by generating weighted values of differences between field signature values that correspond to fields that are two fields apart and by summing the weighted values; and means, responsive to the non-interlaced to interlaced probability data, for selectively de-interlacing the interlaced input video stream.

16. The system of claim 15 wherein the means for generating non-interlaced to interlaced probability data includes a plurality of selectable non-interlaced probability data generating stages.

17. The system of claim 15 wherein the means for determining includes a frame storage device for storing field data in an order selected by the means for determining such that only field data from original film frames are interlaced into a video frame for display on the progressive display device.

18. A method for reconstructing a plurality of converted images of non-interlaced captured content, from an interlaced input video stream that does not contain pre-coded conversion status data, for display on a progressive screen comprising the steps of:

determining whether the plurality of converted images in the interlaced input video stream underwent non-interlaced to interlaced conversion to identify if the interlaced input video stream was originally recorded progressively, by generating non-interlaced to interlaced probability data based on analyzing image data in the interlaced input video stream; and selectively de-interlacing the interlaced input video stream based on the non-interlaced to interlaced probability data.

19. The method of claim 18 wherein the step of determining includes the step of generating a plurality of field signature values on a per field basis for use in generating the non-interlaced to interlaced probability data and analyzing the non-interlaced to interlaced probability data to determine whether the interlaced input stream was originally recorded on film.

20. The method of claim 19 wherein the step generating the plurality of signature values includes dividing portions of image data into regions and generating region values based on fluctuations in pixel data.

21. The method of claim 18 wherein the step of determining includes generating the non-interlaced to interlaced probability data based on a direct comparison of pixel data between sequential frames.

22. The method of claim 19 wherein determining includes generating the non-interlaced to interlaced probability data by evaluating differences in the plurality of field signature values between fields that follow each other and also by evaluating differences between field signature values corresponding to fields that are two fields apart in time.

23. The method of claim 22 wherein generating the probability data includes evaluating differences in field signature values by generating weighted values of the magnitude of differences between fields that follow each other and by generating weighted values of differences between field signature values that correspond to fields that are two fields apart and by summing the weighted values.

24. The method of claim 19 wherein generating the plurality of signature values further includes determining region values within a horizontal scan line on a per field basis and for summing corresponding region values to generate the signature values.

25. The method of claim 22 wherein determining includes generating film reconstruction data to facilitate storing of field data in an order such that only field data from original film frames are interlaced into a video frame for display on the progressive display device.

26. The method of claim 19 wherein the field signature values are based on data representing changes in luminance along a horizontal scan line containing image data.

27. The method of claim 18 wherein the step of determining includes the step of generating a plurality of field signature values on a per field basis for use in generating the non-interlaced to interlaced probability data and analyzing the non-interlaced to interlaced probability data to determine whether the interlaced input stream contains a paused image.

28. The method of claim 18 wherein the step of determining includes the step of generating a plurality of field signature values on a per field basis for use in generating the non-interlaced to interlaced probability data and analyzing the non-interlaced to interlaced probability data to determine whether the interlaced input stream contains slow motion playback images.

29. A system for determining video stream content comprising:

means for determining whether an input video stream contains a pattern of differences between fields and for generating probability data based on weighting factors and based on the differences in field data and means, responsive to the means for determining, for selectively de-interlacing the interlaced input video stream based on analysis of field patterns by the means for determining.

30. The system of claim 29 wherein the means for determining determines whether the input video stream contains a paused image.

31. The system of claim 29 wherein the means for determining determines whether the input video stream contains no motion.

32. A system for determining video stream content comprising:

means for generating a plurality of field signature values on a per field basis;

means, responsive to the field signature values, for determining whether an input video stream contains slow motion playback images; and means, responsive to the means for determining, for selectively de-interlacing the interlaced input video stream based on analysis of field patterns by the means for determining.

33. The system of claim 32 wherein the means for determining generates pattern probability data in response to the field signature values.

34. The system of claim 32 wherein the means for generating includes means for dividing portions of image data into regions and generating region values based on fluctuations in pixel data and means for combining region values to create a signature value from the region values.

35. The system of claim 34 wherein the means for dividing includes region width determination means, responsive to Y coordinate video image data, for determining region values within a horizontal scan line on a per field basis and for summing corresponding region values to generate the signature values.

36. A system for determining video stream content comprising:

means for determining whether an input video stream contains a pattern of differences between fields and for generating probability data based on the differences in field data and for determining whether the input video stream contains a paused image, and means, responsive to the means for determining, for selectively de-interlacing the interlaced input video stream based on analysis of field patterns by the means for determining.

37. A system for determining video stream content comprising:

means for determining whether an input video stream contains a pattern of differences between fields and for generating probability data based on the differences in field data and for generating pattern probability data in response to field signature values, and means, responsive to the means for determining, for selectively de-interlacing the interlaced input video stream based on analysis of field patterns by the means for determining.

38. The system of claim 37 wherein the means for generating includes means for dividing portions of image data into regions and generating region values based on fluctuations in pixel data and means for combining region values to create a signature value from the region values.

39. The system of claim 38 wherein the means for dividing includes region width determination means, responsive to Y coordinate video image data, for determining region values within a horizontal scan line on a per field basis and for summing corresponding region values to generate the signature values.

40. The system of claim 38 wherein the means for determining compares field signature values from adjacent fields and two fields apart and analyzes the differences over time to determine if any pattern exists.

* * * * *